United States Patent
Hirade et al.

(10) Patent No.: US 9,931,725 B2
(45) Date of Patent: Apr. 3, 2018

(54) SHAFT MEMBER FOR FLUID DYNAMIC BEARING DEVICE AND MANUFACTURING METHOD FOR SHAFT MEMBER

(71) Applicant: NTN CORPORATION, Osaka (JP)

(72) Inventors: Jun Hirade, Mie (JP); Shuichi Komatsu, Mie (JP)

(73) Assignee: NTN CORPORATION, Osaka (JP)

( * ) Notice: Subject to any disclaimer, the term of this patent is extended or adjusted under 35 U.S.C. 154(b) by 121 days.

(21) Appl. No.: 14/908,259

(22) PCT Filed: Jul. 29, 2014

(86) PCT No.: PCT/JP2014/069967
§ 371 (c)(1),
(2) Date: Jan. 28, 2016

(87) PCT Pub. No.: WO2015/029677
PCT Pub. Date: Mar. 5, 2015

(65) Prior Publication Data
US 2016/0176005 A1 Jun. 23, 2016

(30) Foreign Application Priority Data
Aug. 29, 2013 (JP) .................................. 2013-178193

(51) Int. Cl.
*B24B 5/30* (2006.01)
*B24B 5/307* (2006.01)
(Continued)

(52) U.S. Cl.
CPC ................ *B24B 5/307* (2013.01); *B24B 5/04* (2013.01); *F16C 3/02* (2013.01); *F16C 17/107* (2013.01);
(Continued)

(58) Field of Classification Search
CPC .......... B24B 5/307; F16C 3/02; F16C 17/107; F16C 33/14; F16C 2220/70; F16C 2226/10
(Continued)

(56) References Cited

U.S. PATENT DOCUMENTS 3,418,763 A * 12/1968 Soderquist .............. B24B 5/185
451/242
3,811,234 A * 5/1974 Soares, Jr. .............. B23P 15/32
451/48

(Continued)

FOREIGN PATENT DOCUMENTS

JP          9-314464     12/1997
JP          2003-139137  5/2003
(Continued)

OTHER PUBLICATIONS

Extended European Search Report dated May 22, 2017 in counterpart European Patent Application No. 14840360.3.
(Continued)

*Primary Examiner* — George Nguyen
(74) *Attorney, Agent, or Firm* — Wenderoth, Lind & Ponack, L.L.P.

(57) ABSTRACT

Grinding is performed on an outer peripheral surface of a shaft member while rotationally driving the shaft member under a state in which both end surfaces of the shaft member are sandwiched between a pair of support portions. A convex surface is formed on one axial end surface of the shaft member or an end surface of one of the pair of support portions, and a flat surface is formed on the other of the one axial end surface of the shaft member and the end surface of the one of the pair of support portions. The flat surface and
(Continued)

an apex of the convex surface are brought into contact with each other to support one axial end portion of the shaft member.

12 Claims, 6 Drawing Sheets

(51) Int. Cl.
    *B24B 5/04*     (2006.01)
    *F16C 33/14*     (2006.01)
    *F16C 17/10*     (2006.01)
    *F16C 3/02*     (2006.01)

(52) U.S. Cl.
    CPC .......... *F16C 33/14* (2013.01); *F16C 2220/70* (2013.01); *F16C 2226/10* (2013.01)

(58) Field of Classification Search
    USPC .................................................... 451/57, 49
    See application file for complete search history.

(56) References Cited

U.S. PATENT DOCUMENTS

| | | | | |
|---|---|---|---|---|
| 4,435,973 A | * | 3/1984 | Nakazawa | ................ B21J 5/08 72/327 |
| 4,547,081 A | | 10/1985 | Tanaka et al. | |
| 4,841,682 A | * | 6/1989 | Waelti | ....................... B24B 5/01 451/245 |
| 5,525,092 A | * | 6/1996 | Hirano | .................... B23B 29/00 451/10 |
| 5,893,793 A | * | 4/1999 | Nishio | .................... B23B 23/00 451/397 |
| 8,387,246 B2 | * | 3/2013 | Yamashita | ............... B21K 1/12 29/890.02 |
| 2003/0213128 A1 | | 11/2003 | Kaimi et al. | |
| 2006/0185415 A1 | * | 8/2006 | Bergue | ....................... B21J 1/04 72/347 |
| 2009/0080817 A1 | | 3/2009 | Gomyo | |

FOREIGN PATENT DOCUMENTS

| | | |
|---|---|---|
| JP | 2003-307221 | 10/2003 |
| JP | 2006-105390 | 4/2006 |
| JP | 2008-298234 | 12/2008 |
| JP | 2009-79658 | 4/2009 |
| JP | 4504391 | 7/2010 |

OTHER PUBLICATIONS

International Search Report dated Oct. 7, 2014 in International (PCT) Application No. PCT/JP2014/069967.
English translation of the International Preliminary Report on Patentability and Written Opinion of the International Searching Authority dated Mar. 1, 2016 in corresponding International Application No. PCT/JP2014/069967.

* cited by examiner

SHAFT MEMBER FOR FLUID DYNAMIC BEARING DEVICE AND MANUFACTURING METHOD FOR SHAFT MEMBER

TECHNICAL FIELD

The present invention relates to a shaft member for a fluid dynamic bearing device, and to a method of manufacturing the shaft member.

BACKGROUND ART

A fluid dynamic bearing device is configured to relatively rotatably support a shaft member in a non-contact manner by a pressure (dynamic pressure generating action) of a film of an oil filled into a radial bearing gap defined between an outer peripheral surface of the shaft member and an inner peripheral surface of a bearing member. The fluid dynamic bearing device has advantages in high rotational accuracy and quietness. Thus, the fluid dynamic bearing device is preferably usable for a spindle motor incorporated in information equipment (for example, magnetic disk drives such as an HDD, drives for optical discs such as a CD-ROM, a CD-R/RW, a DVD-ROM/RAM, and a Blu-ray Disc, and drives for magneto-optical disks such as an MD and an MO), a polygon scanner motor for a laser beam printer (LBP), a color wheel for a projector, and a small-sized motor such as a fan motor to be used for a cooling fan or the like of an electrical apparatus.

As a method of manufacturing the shaft member to be used for such a fluid dynamic bearing device, for example, in JP 4504391 B2, there is described a method of grinding an outer peripheral surface of the shaft member on a grindstone while rotating the shaft member about an axial center thereof under a state in which the shaft member is sandwiched between a pair of plate members from both axial sides of the shaft member. At this time, each end surface of the shaft member and each of the plate members are held in plane-contact with each other.

Technical Problem

As described in JP 4504391 B2, in a case of supporting each end surface of the shaft member in a plane-contact manner, surface accuracy of each end surface of the shaft member (for example, a degree of parallelization of each end surface and runout accuracy of each end surface) directly affects processing accuracy of the outer peripheral surface of the shaft member. In other words, when the surface accuracy of each end surface of the shaft member is poor, a rotation center of the shaft member is not stabilized, and vibration-rotation is caused. Accordingly, there is a concern in that the outer peripheral surface of the shaft member after grinding exhibits an elliptic shape or the like in cross section so that required dimension accuracy (such as circularity) cannot be obtained. Further, the surface accuracy of the end surface of the shaft member fluctuates from product to product, thereby varying a supported state of the shaft member from product to product. Consequently, there is a concern in that dimension accuracy of the outer peripheral surface of the shaft member after grinding significantly fluctuates from product to product.

SUMMARY OF INVENTION

A technical object to be achieved by the present invention is to provide a method of manufacturing a shaft member, which is capable of processing an outer peripheral surface of the shaft member with high accuracy.

Solution to Problem

In order to attain the above-mentioned object, according to one embodiment of the present invention, there is provided a method of manufacturing a shaft member for a fluid dynamic bearing device, comprising grinding an outer peripheral surface of a shaft member while rotationally driving the shaft member under a state in which both end surfaces of the shaft member are sandwiched between a pair of support portions from both axial sides of the shaft member, wherein one of one axial end surface of the shaft member and an end surface of one support portion, which is configured to support the one axial end surface in a contact manner, has a flat surface formed thereon, wherein another one of the one axial end surface of the shaft member and the end surface of the one support portion has a convex surface formed thereon by swelling an inner-diameter portion thereof to the flat surface side, and wherein the manufacturing method further comprises bringing the flat surface and an apex of the convex surface into contact with each other to support one axial end portion of the shaft member.

As described above, the flat surface is formed on one of the end surface of the shaft member and the end surface of the support portion. Further, the convex surface is formed on another one of the end surface of the shaft member and the end surface of the support portion. Accordingly, irrespective of surface accuracy of the end surface of the shaft member, the apex of the convex surface and the flat surface can be always brought into contact with each other. With this, a supported state of the shaft member, and a rotation center of the shaft member can be stabilized. Accordingly, grinding accuracy of the outer peripheral surface can be increased, and fluctuations in dimension accuracy of the outer peripheral surface from product to product can be reduced.

In the above-mentioned method, both of another axial end surface of the shaft member and an end surface of another support portion, which is configured to support the another axial end surface in a contact manner, may have flat surfaces formed thereon, and the flat surfaces may be brought into contact with each other to support another axial end portion of the shaft member. With this, as compared to one axial end portion of the shaft member, which is supported by contact between the convex surface and the flat surface, the contact area between the another end surface of the shaft member and the another support portion can be increased so that the another end surface and the another support portion are less liable to slip from each other. Under this state, when the shaft member is rotationally driven by the another support portion, the shaft member can be rotated at high speed, thereby increasing processing efficiency.

In this case, it is preferred that the grinding be performed on the outer peripheral surface of the shaft member after grinding is performed on the another axial end surface of the shaft member. As described above, the another axial end surface (flat surface) of the shaft member is finished in advance by grinding with high accuracy, thereby being capable of obtaining a satisfactory plane-contact state between the another axial end surface and the another support portion. Consequently, the speed of rotating the shaft member can be further increased.

In the above-mentioned method, for example, the grinding may be performed on the outer peripheral surface of the shaft member after the shaft member is formed by turning.

In the above-mentioned method, when the grinding is performed on the outer peripheral surface of the shaft member while the outer peripheral surface of the shaft member is supported by a support member in a contact manner, it is possible to grind the outer peripheral surface of the shaft member with high accuracy with reference to the support member.

For example, the shaft member comprising a flange portion can be processed by the above-mentioned method. In particular, when an end surface of the flange portion is brought into plane-contact with the another support portion, a large contact area can be secured therebetween. Accordingly, it is possible to further increase the rotational speed of the shaft member when rotationally driving the shaft member by the another support portion.

Advantageous Effects of Invention

As described above, according to the one embodiment of the present invention, it is possible to process the outer peripheral surface of the shaft member with high accuracy.

DESCRIPTION OF EMBODIMENTS

Figure 1:
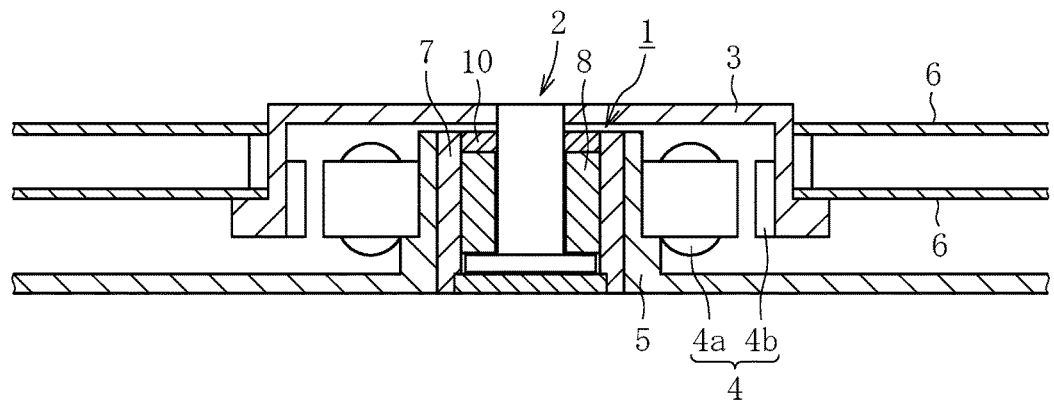
FIG. 1 is a sectional view of a spindle motor.

A spindle motor illustrated in FIG. 1 is used for a disk drive such as an HDD. The spindle motor comprises a fluid dynamic bearing device 1, a disk hub 3 fixed to a shaft member 2 of the fluid dynamic bearing device 1, a driving unit 4 comprising a stator coil 4a and a rotor magnet 4b opposed to each other through intermediation of, for example, a radial gap, and a bracket 5. The stator coil 4a is fixed to the bracket 5, and the rotor magnet 4b is fixed to the disk hub 3. The fluid dynamic bearing device 1 is fixed on an inner periphery of the bracket 5. The disk hub 3 holds a predetermined number of disks 6 (two disks in FIG. 1). When the stator coil 4a is energized, the rotor magnet 4b is rotated, thereby causing the disks 6 held on the disk hub 3 to rotate integrally with the shaft member 2.

Figure 2:
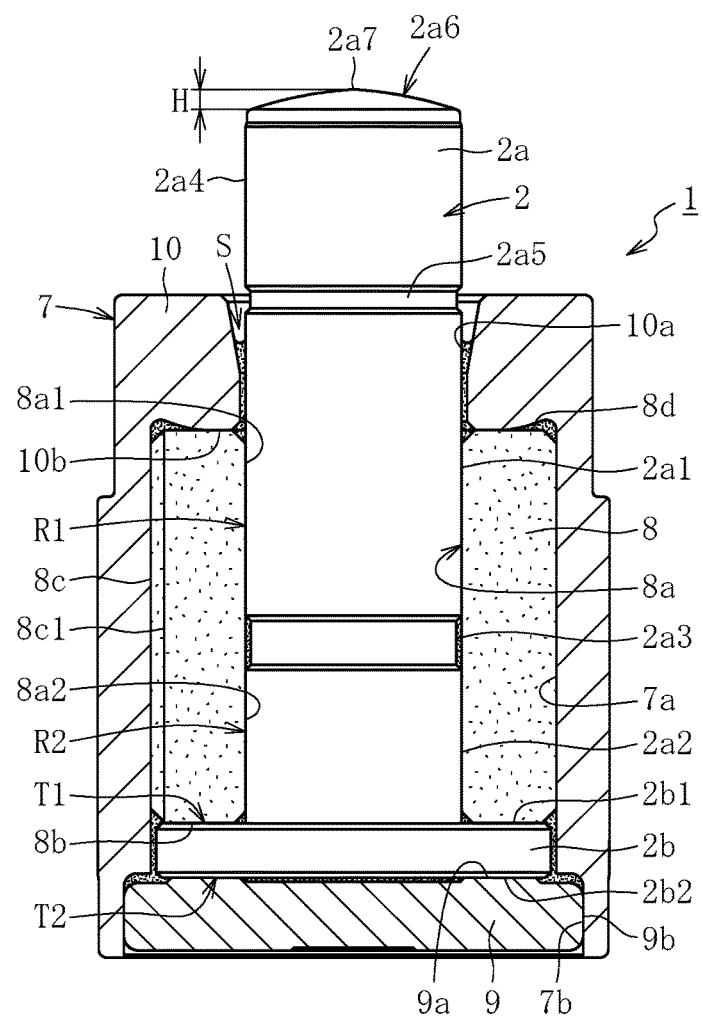
FIG. 2 is a sectional view of a fluid dynamic bearing device incorporated into the spindle motor.

As illustrated in FIG. 2, the fluid dynamic bearing device 1 mainly comprises the shaft member 2 manufactured by a manufacturing method according to the present invention (which is described below in detail), a bearing sleeve 8 having an inner periphery on which the shaft member 2 is inserted, a tubular housing 7 having an inner peripheral surface on which the bearing sleeve 8 is fixed, a lid member 9 closing an opening portion of the housing 7 on one axial end side thereof, and a seal portion 10 formed in an opening portion of the housing 7 on another axial end side thereof. In this embodiment, the housing 7 and the seal portion 10 are formed integrally with each other. Note that, in the following description of the fluid dynamic bearing device 1, for convenience of description, an opening side of the housing 7 is referred to as an upper side, and a closed side of the housing 7 is referred to as a lower side.

The shaft member 2 is made of a metal material such as stainless steel, and comprises a shaft portion 2a, and a flange portion 2b protruding from the shaft portion 2a radially outward. In the illustrated example, the flange portion 2b is integrally formed at a lower end of the shaft portion 2a. A first cylindrical surface 2a1 and a second cylindrical surface 2a2 are formed on an outer peripheral surface of the shaft portion 2a to be spaced apart from each other in an axial direction. Both of the cylindrical surfaces 2a1 and 2a2 are formed into smooth cylindrical surfaces having the same diameter. In an axial intermediate portion between the cylindrical surfaces 2a1 and 2a2, there is formed a relief portion 2a3 formed into a cylindrical surface having a diameter slightly smaller than the diameters of the cylindrical surfaces 2a1 and 2a2. A mounting surface 2a4 to be mounted to the disk hub 3 is formed at an upper end of the outer peripheral surface of the shaft portion 2a. The mounting surface 2a4 is formed into a smooth cylindrical surface. An annular groove 2a5 is formed between the mounting surface 2a4 and the first cylindrical surface 2a1. An outer diameter of the shaft portion 2a (outer diameters of the first and second cylindrical surfaces 2a1 and 2a2) is set to, for example, approximately from 1 mm to 4 mm.

Figure 3:
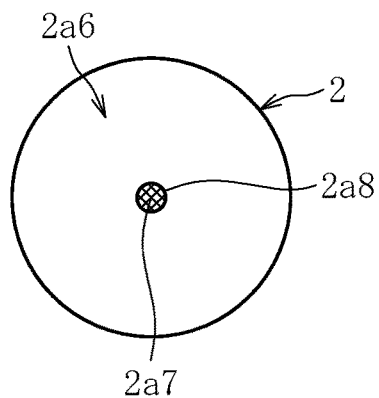
FIG. 3 is a plan view of an end surface of a shaft member of the fluid dynamic bearing device.

On an upper end surface of the shaft portion 2a, a convex surface is formed by protruding an inner-diameter portion of the shaft portion 2a upward. In the illustrated example, the entire upper end surface is formed of a spherical convex surface 2a6 obtained by protruding an axial center of the shaft portion 2a upward. As illustrated in FIG. 3 by crosshatching, at an apex 2a7 (axial center) of the convex surface 2a6, there is a support mark 2a8 formed when finish grinding described later is performed on the outer peripheral surface. Note that, in FIG. 2, an axial height H of the convex surface 2a6 is illustrated exaggeratedly. However, in actuality, the axial height H is set to, for example, approximately from 5 μm to 20 μm.

The flange portion 2b has a disk shape. An upper end surface 2b1 and a lower end surface 2b2 of the flange portion 2b are each formed into a flat surface having no convex and no concave. An outer peripheral surface of the flange portion 2b is formed into a smooth cylindrical surface.

Figure 4:
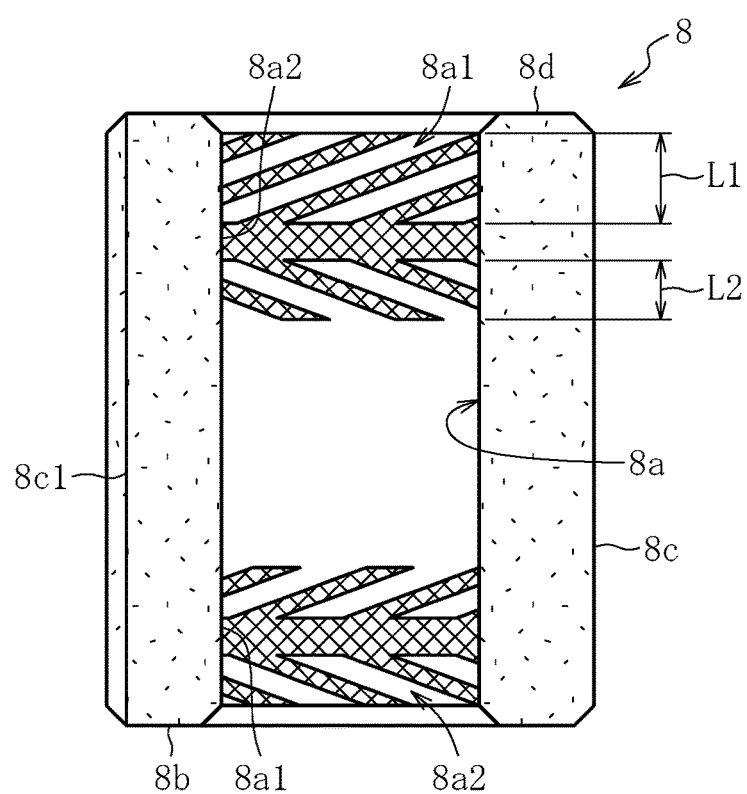
FIG. 4 is a sectional view of a bearing sleeve of the fluid dynamic bearing device.
Figure 5:
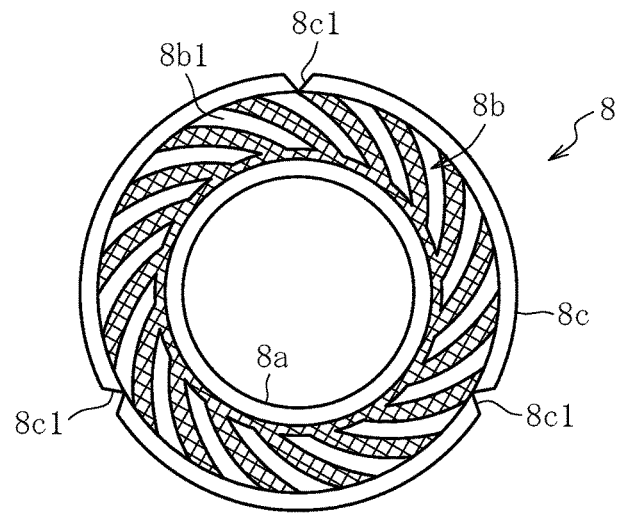
FIG. 5 is a plan view of the bearing sleeve.

The bearing sleeve 8 is made of, for example, sintered metal. In two regions of an inner peripheral surface 8a of the bearing sleeve 8, which are separated from each other in the axial direction, dynamic pressure generating grooves 8a1 and 8a2 are formed in a herringbone pattern as illustrated in FIG. 4. In a lower end surface 8b of the bearing sleeve 8, dynamic pressure generating grooves 8b1 are formed in a spiral pattern as illustrated in FIG. 5. Further, in an outer peripheral surface 8c of the bearing sleeve 8, a plurality of (three in the illustrated example) axial grooves 8c1 are formed.

The housing 7 is made of a resin or metal. In this embodiment, the housing 7 is formed by injection molding of a resin. The housing 7 has a cylindrical shape having openings formed in both axial ends thereof (see FIG. 2). An inner peripheral surface of the housing 7 comprises a small-diameter inner peripheral surface 7a, and a large-diameter inner peripheral surface 7b formed below the small-diameter inner peripheral surface 7a and having a diameter larger than that of the small-diameter inner peripheral surface 7a. The outer peripheral surface 8c of the bearing sleeve 8 is fixed on the small-diameter inner peripheral surface 7a by an appropriate measure such as bonding or press-fitting. An outer peripheral surface 9b of the lid member 9 is fixed on the large-diameter inner peripheral surface 7b by an appropriate measure such as bonding or press-fitting.

The lid member 9 is made of metal or a resin, and is formed into a disk shape. In an upper end surface 9a of the lid member 9, dynamic pressure generating grooves (not shown) are formed in a spiral pattern.

The seal portion 10 is formed in the opening portion of the housing 7 at the upper end thereof. In this embodiment, the seal portion 10 and the housing 7 are integrally made of a resin. An inner peripheral surface 10a of the seal portion 10 is flared upward to be gradually increased in diameter. Between the inner peripheral surface 10a of the seal portion 10 and the outer peripheral surface (upper region of the first cylindrical surface 2a1) of the shaft portion 2a, a seal space S is formed to have a wedge-shaped cross section extending downward to be gradually decreased in radial width.

A lubricating oil is injected into the fluid dynamic bearing device 1 comprising the above-mentioned components. In this manner, an internal space of the fluid dynamic bearing device 1 including internal pores of the bearing sleeve 8 is filled with the lubricating oil, and an oil surface is always maintained within the seal space S.

When the shaft member 2 is rotated, a radial bearing gap is defined between the inner peripheral surface 8a (region where the dynamic pressure generating grooves 8a1 and 8a2 are formed) of the bearing sleeve 8 and the outer peripheral surface (a lower region of the first cylindrical surface 2a1 and the second cylindrical surface 2a2) of the shaft portion 2a. Further, a pressure of an oil film in the radial bearing gap is increased by the dynamic pressure generating grooves 8a1 and 8a2. Owing to this dynamic pressure generating action, there are formed a first radial bearing portion R1 and a second radial bearing portion R2 configured to rotatably support the shaft portion 2a in a non-contact manner.

At the same time, thrust bearing gaps are defined between the upper end surface 2b1 of the flange portion 2b and the lower end surface 8b (region where the dynamic pressure generating grooves 8b1 are formed) of the bearing sleeve 8, and between the lower end surface 2b2 of the flange portion 2b and the upper end surface 9a (region where the dynamic pressure generating grooves are formed) of the lid member 9. Further, a pressure of an oil film in each of the thrust bearing gaps is increased by the dynamic pressure generating grooves. Owing to this dynamic pressure generating action, there are formed a first thrust bearing portion T1 and a second thrust bearing portion T2 configured to rotatably support the flange portion 2b in both thrust directions in a non-contact manner.

Now, a method of manufacturing the shaft member 2 according to the embodiment of the present invention is described. In this embodiment, the shaft member 2 is manufactured through a turning step, a first grinding step, and a second grinding step.

In the turning step, the shaft member 2 is formed by turning. The shaft member 2 has substantially the same shape as that illustrated in FIG. 2. In other words, the shaft member 2 that has undergone turning integrally comprises the shaft portion 2a and the flange portion 2b, and the first cylindrical surface 2a1, the second cylindrical surface 2a2, the relief portion 2a3, the mounting surface 2a4, the annular groove 2a5, and the spherical convex surface 2a6 are formed in the shaft portion 2a.

After that, the first grinding step and the second grinding step are performed on the shaft member 2 formed in the turning step. Note that, in the following description, description is made of a case where processing is performed under a state in which the axial direction of the shaft member 2 extends horizontally. The right side of the drawing sheet (convex surface 2a6 side) is referred to as one side, and the left side of the drawing sheet (flange portion 2b side) is referred to as another side.

Figure 6A:
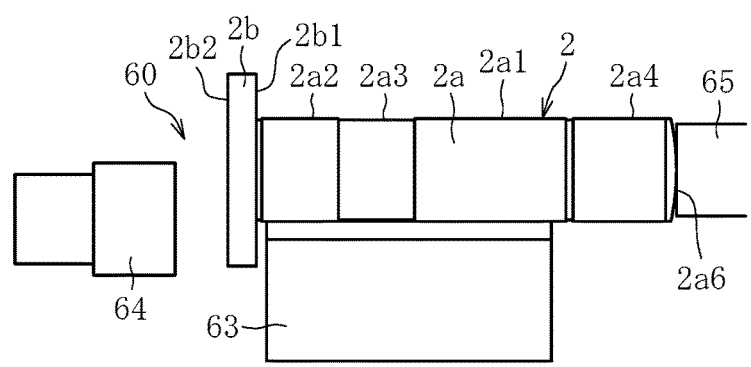
FIG. 6A is a side view for illustrating a first grinding step of a method of manufacturing the shaft member according to an embodiment of the present invention.
Figure 6B:
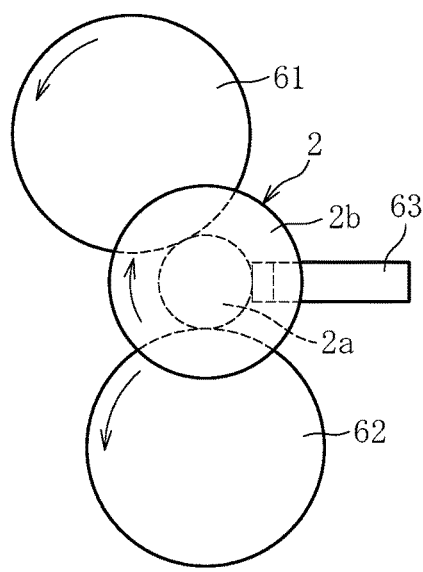
FIG. 6B is a front view for illustrating the first grinding step of the manufacturing method.

In the first grinding step, as illustrated in FIG. 6, grinding is performed on the another-side end surface (lower end surface 2b2 of the flange portion 2b) of the shaft member 2. A grinding apparatus 60 to be used in this case is configured to perform so-called centerless grinding by a method of using two rollers and one shoe. Specifically, while two drive rollers 61 and 62 and a shoe 63 support the outer peripheral surface (the first cylindrical surface 2a1 and the second cylindrical surface 2a2) of the shaft portion 2a of the shaft member 2 in a three-point contact manner, the drive rollers 61 and 62 are rotated, thereby rotationally driving the shaft member 2 (see the arrows in FIG. 6B). Under this state, while a pressure plate 65 supports the convex surface 2a6 of the shaft portion 2a in a contact manner, grinding is performed while a grindstone 64 is pressed against the another-side end surface 2b2 of the flange portion 2b. Note that, in FIG. 6A, illustration of the drive rollers 61 and 62 is omitted.

Figure 7A:
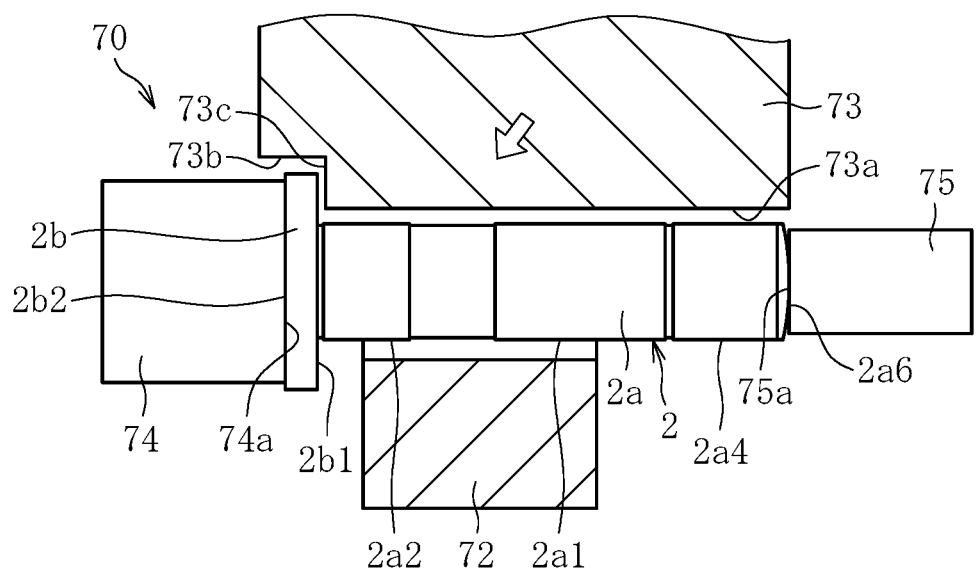
FIG. 7A is a side view for illustrating a second grinding step of the manufacturing method.

After that, in the second grinding step, grinding is performed on the outer peripheral surface (the first cylindrical surface 2a1, the second cylindrical surface 2a2, and the mounting surface 2a4) of the shaft member 2 and on the one-side end surface 2b1 and the outer peripheral surface of the flange portion 2b. As illustrated in FIG. 7A, a grinding apparatus 70 to be used in the second grinding step comprises a shoe 72 serving as a support member, a grindstone 73, and a backing plate 74 and a pressure plate 75 serving as a pair of support portions.

Figure 7B:
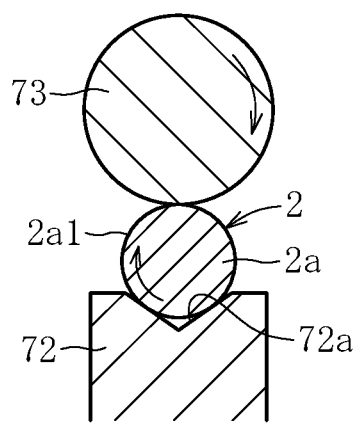
FIG. 7B is a sectional view taken along a direction orthogonal to an axis of the shaft member, for illustrating the second grinding step of the manufacturing method.

As illustrated in FIG. 7B, the shoe 72 has a V-shaped groove 72a formed therein. An inner surface of the V-shaped groove 72a is configured to support the outer peripheral surface (the first cylindrical surface 2a1, the second cylindrical surface 2a2, and the mounting surface 2a4) of the shaft portion 2a of the shaft member 2 in a contact manner. The grindstone 73 comprises a first grinding surface 73a and a second grinding surface 73b extending in the axial direction, and a third grinding surface 73c extending in a direction orthogonal to the axial direction to connect the first grinding surface 73a and the second grinding surface 73b. The grindstone 73 is rotationally driven by a driving apparatus (such as a motor) (not shown). The backing plate 74 is arranged at a fixed position in the axial direction, and is rotationally driven by a driving apparatus (such as a motor) (not shown). The pressure plate 75 is rotatable coaxially with the backing plate 74. The pressure plate 75 can be urged to another side in the axial direction by an urging unit (not shown). An end surface 74a of the backing plate 74 and an end surface 75a of the pressure plate 75 are each formed into a flat surface having no convex and no concave.

Figure 8:
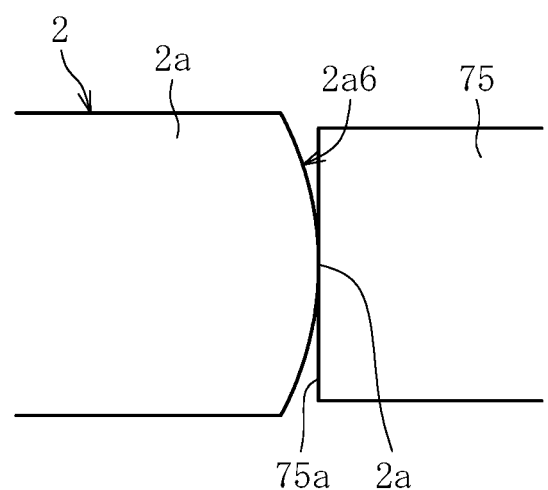
FIG. 8 is an enlarged view of FIG. 7A.

In the second grinding step, first, the shaft member 2 is arranged between the backing plate 74 and the pressure plate 75, and the pressure plate 75 is urged to another side in the axial direction. Thus, the shaft member 2 is sandwiched between the both plates 74 and 75. At this time, the end surface 74a of the backing plate 74 is brought into plane-contact with the another-side end surface (the lower end surface 2b2 of the flange portion 2b) of the shaft member 2. Further, the end surface 75a of the pressure plate 75 is brought into point-contact with the apex 2a7 of the spherical convex surface 2a6 formed on the one-side end portion of the shaft member 2 (see FIG. 8). Under this state, the backing plate 74 and the pressure plate 75 are rotationally driven in synchronization with each other, thereby integrally rotating the backing plate 74, the shaft member 2, and the pressure plate 75.

Under a state in which the shaft member 2 is rotated about the axial center thereof as described above, the grindstone 73 is brought into contact with the shaft member 2 from a radially outer side of the shaft member 2 while being rotationally driven, thereby grinding the shaft member 2. Specifically, the grindstone 73 is pressed against the shaft member 2 obliquely (see the arrow in FIG. 7A). In this manner, the outer peripheral surface (the first cylindrical surface 2a1, the second cylindrical surface 2a2, and the mounting surface 2a4) of the shaft member 2 is ground on the first grinding surface 73a of the grindstone 73, and the outer peripheral surface of the flange portion 2b is ground on the second grinding surface 73b of the grindstone 73. Further, the one-side end surface 2b1 of the flange portion 2b is ground on the third grinding surface 73b of the grindstone 73. At this time, grinding is performed on the outer peripheral surface of the shaft member 2 while the outer peripheral surface is always pressed against the inner surface of the V-shaped groove 72a of the shoe 72 serving as the support member. Thus, the outer peripheral surface of the shaft member 2 can be processed with high accuracy with reference to the shoe 72. Note that, the grindstone 73 is not always necessary to be pressed against the shaft member 2 obliquely as described above. For example, the grindstone 73 may be pressed against the shaft member 2 from the radially outer side of the shaft member 2 (not shown). In this case, the outer peripheral surface of the shaft member 2 and the outer peripheral surface of the flange portion 2b are ground on the grindstone 73, but the end surface 2b1 of the flange portion 2b is not ground on the grindstone 73.

At this time, the convex surface 2a6 is formed on one of the end surfaces of the shaft member 2. Accordingly, when the shaft member 2 is sandwiched between the backing plate 74 and the pressure plate 75, the apex 2a7 (axial center) of the convex surface 2a6 can be always brought into contact with the end surface 75a of the pressure plate 75 (see FIG. 8). With this, irrespective of surface accuracy of the one of the end surfaces of the shaft member 2, a supported state of the shaft member 2, and a rotation center of the shaft member 2 can be stabilized. Accordingly, grinding accuracy of the outer peripheral surface (specifically, the first cylindrical surface 2a1 and the second cylindrical surface 2a2) of the shaft member 2 can be enhanced, and fluctuations in dimension accuracy of the outer peripheral surface can be reduced.

Further, the another-side end surface 2b2 of the shaft member 2 and the backing plate 74 are brought into plane-contact with each other. With this, the contact area therebetween is increased so that the backing plate 74 and the end surface 2b2 are less liable to slip from each other. In particular, when the end surface 2b2 of the flange portion 2b is brought into plane-contact with the backing plate 74 as in this embodiment, the contact area can be further increased so that both the end surface 2b2 and the backing plate 74 are still less liable to slip from each other. Thus, speed of rotationally driving the shaft member 2 by the backing plate 74 can be increased, and processing efficiency can be increased.

Further, as described above, after grinding is performed in advance on the another-side end surface 2b2 of the shaft member 2 in the first grinding step, the second grinding step is performed. Thus, in the second grinding step, the end surface 2b2 of the shaft member 2 finished with high accuracy can be brought into plane-contact with the backing plate 74, thereby obtaining a further satisfactory contact state between the end surface 2b2 and the backing plate 74. With this, the end surface 2b2 and the backing plate 74 are still less liable to slip from each other. Accordingly, speed of rotating the shaft member 2 is further increased so that processing efficiency can be further enhanced. Further, the supported state of the shaft member 2 is further stabilized so that grinding accuracy of the outer peripheral surface is further enhanced.

Figure 9:
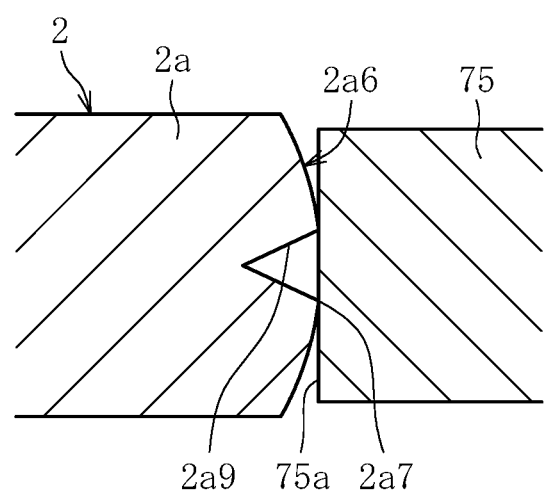
FIG. 9 is an enlarged sectional view for illustrating a second grinding step of a method of manufacturing a shaft member according to another embodiment of the present invention.
Figure 10:
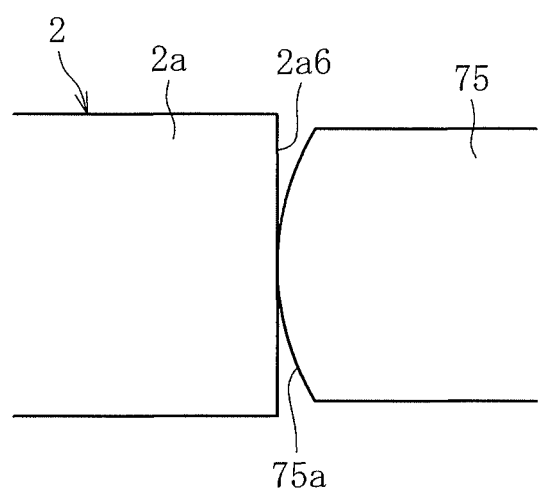
FIG. 10 is an enlarged sectional view for illustrating a second grinding step of a method of manufacturing a shaft member according to a further embodiment of the present invention.

The present invention is not limited to the above-mentioned embodiment. For example, in an embodiment illustrated in FIG. 9, a concave portion 2a9 is formed in the axial center of the spherical convex surface 2a6 formed on the one-side end surface of the shaft portion 2a of the shaft member 2. When the shaft member 2 is sandwiched between the backing plate 74 and the pressure plate 75 from both axial sides of the shaft member 2, the apex 2a7 (annular region including a rim of the opening portion of the concave portion 2a9) of the convex surface 2a6 is brought into contact with the flat end surface 75a of the pressure plate 75, thereby being capable of stably supporting the shaft member 2. In this case, an annular support mark (not shown) is formed on a portion of the one-side end surface of the shaft portion 2a around the opening portion of the concave portion 2a9.

Further, in the above-mentioned embodiment, description is made of the case where the convex surface 2a6 is formed on the one-side end surface of the shaft member 2 and the end surface 75a of the pressure plate 75 configured to support the one-side end surface is formed into a flat surface. However, conversely, the one-side end surface of the shaft member 2 may be formed into a flat surface, and a convex surface obtained by protruding an inner-diameter portion of the pressure plate 75 to the shaft member 2 side may be formed on the end surface 75a of the pressure plate 75 (not shown).

Further, in the above-mentioned embodiment, description is made of the case where the shaft member 2 is formed by turning, but the present invention is not limited thereto. For example, the shaft member 2 may be formed by forging. In this case, although not shown, after the shaft member 2 comprising a cylindrical shaft portion is formed by forging, the relief portion 2a3, the annular groove 2a5, and the convex surface 2a6 are formed in the shaft member 2 by cutting work or the like. Then, the first grinding step and the second grinding step are performed on the shaft member 2.

Further, in the above-mentioned embodiment, description is made of the case of manufacturing the shaft member 2 comprising the flange portion 2b formed at the end portion of the shaft portion 2a, but the present invention is not limited thereto. For example, the method according to the present invention is also applicable to the shaft member 2 comprising the flange portion 2b formed on an axial intermediate portion of the shaft portion 2a. Alternatively, the method according to the present invention is also applicable to the shaft member 2 comprising only the shaft portion 2a and comprising no flange portion 2b.

REFERENCE SIGNS LIST 1 fluid dynamic bearing device
2 shaft member
2a shaft portion
2a6 convex surface
2a7 apex
2a8 support mark
2b flange portion
70 grinding apparatus
72 shoe (support member)
73 grindstone
74 backing plate (other support portion)
75 pressure plate (one support portion)
R1, R2 radial bearing portion
T1, T2 thrust bearing portion
S seal space

The invention claimed is:

1. A method of manufacturing a shaft member for a fluid dynamic bearing device, comprising grinding an outer peripheral surface of the shaft member while rotationally driving the shaft member under a state in which both end surfaces of the shaft member are sandwiched between a first support portion and a second support portion from both axial sides of the shaft member,
wherein an end surface of the first support portion has a flat surface formed thereon,
wherein one axial end surface of the shaft member has a convex surface formed thereon, and
wherein the manufacturing method further comprises bringing the flat surface and an apex of the convex surface into contact with each other to support one axial end portion of the shaft member.

2. The method of manufacturing a shaft member for a fluid dynamic bearing device according to claim 1,
wherein the one axial end surface of the shaft member is a first axial end surface of the shaft member and the one axial end portion of the shaft member is a first axial end portion of the shaft member,
wherein a second axial end surface of the shaft member has a flat surface formed thereon and an end surface of the second support portion has a flat surface formed thereon,
wherein the manufacturing method further comprises bringing the flat surface of the second axial end surface of the shaft member and the flat surface of the second support portion into contact with each other to support a second axial end portion of the shaft member, and
wherein the rotationally driving the shaft member is performed by the second support portion.

3. The method of manufacturing a shaft member for a fluid dynamic bearing device according to claim 2, wherein the grinding is performed on the outer peripheral surface of the shaft member after grinding is performed on the second axial end surface of the shaft member.

4. The method of manufacturing a shaft member for a fluid dynamic bearing device according to claim 1, wherein the grinding is performed on the outer peripheral surface of the shaft member after the shaft member is formed by turning.

5. The method of manufacturing a shaft member for a fluid dynamic bearing device according to claim 1, wherein the grinding is performed on the outer peripheral surface of the shaft member while the outer peripheral surface of the shaft member is supported by contact with a support member.

6. The method of manufacturing a shaft member for a fluid dynamic bearing device according to claim 1, wherein the shaft member comprises a flange portion.

7. A method of manufacturing a shaft member for a fluid dynamic bearing device, comprising grinding an outer peripheral surface of the shaft member while rotationally driving the shaft member under a state in which both end surfaces of the shaft member are sandwiched between a first support portion and a second support portion from both axial sides of the shaft member,
wherein one axial end surface of the shaft member has a flat surface formed thereon,
wherein an end surface of the first support portion has a convex surface formed thereon, and
wherein the manufacturing method further comprises bringing the flat surface and an apex of the convex surface into contact with each other to support one axial end portion of the shaft member.

8. The method of manufacturing a shaft member for a fluid dynamic bearing device according to claim 7,
wherein the one axial end surface of the shaft member is a first axial end surface of the shaft member and the one axial end portion of the shaft member is a first axial end portion of the shaft member,
wherein a second axial end surface of the shaft member has a flat surface formed thereon and an end surface of the second support portion has a flat surface formed thereon,
wherein the manufacturing method further comprises bringing the flat surface of the second axial end surface of the shaft member and the flat surface of the end surface of the second support portion into contact with each other to support a second axial end portion of the shaft member, and
wherein the rotationally driving the shaft member is performed by the second support portion.

9. The method of manufacturing a shaft member for a fluid dynamic bearing device according to claim 8, wherein the grinding is performed on the outer peripheral surface of the shaft member after grinding is performed on the second axial end surface of the shaft member.

10. The method of manufacturing a shaft member for a fluid dynamic bearing device according to claim 7, wherein the grinding is performed on the outer peripheral surface of the shaft member after the shaft member is formed by turning.

11. The method of manufacturing a shaft member for a fluid dynamic bearing device according to claim 7, wherein the grinding is performed on the outer peripheral surface of the shaft member while the outer peripheral surface of the shaft member is supported by contact with a support member.

12. The method of manufacturing a shaft member for a fluid dynamic bearing device according to claim 7, wherein the shaft member comprises a flange portion.

* * * * *